US010402847B2

(12) United States Patent
Marcus

(10) Patent No.: US 10,402,847 B2
(45) Date of Patent: Sep. 3, 2019

(54) SYSTEM AND METHOD OF ELECTRONICALLY VERIFYING REQUIRED PROOF-OF-PERFORMANCE TO SECURE PROMOTIONAL REWARDS

(75) Inventor: Steven Marcus, New Rochelle, NY (US)

(73) Assignee: MOBISAVE LLC, New York, NY (US)

( * ) Notice: Subject to any disclaimer, the term of this patent is extended or adjusted under 35 U.S.C. 154(b) by 1755 days.

(21) Appl. No.: 12/950,103

(22) Filed: Nov. 19, 2010

(65) Prior Publication Data

US 2011/0125561 A1    May 26, 2011

Related U.S. Application Data

(60) Provisional application No. 61/380,453, filed on Sep. 7, 2010, provisional application No. 61/292,940, filed on Jan. 7, 2010, provisional application No. 61/264,549, filed on Nov. 25, 2009, provisional application No. 61/263,211, filed on Nov. 20, 2009.

(51) Int. Cl.
*G06Q 20/20* (2012.01)
*G06Q 20/32* (2012.01)
*G06Q 30/02* (2012.01)

(52) U.S. Cl.
CPC ....... *G06Q 30/0225* (2013.01); *G06Q 20/209* (2013.01); *G06Q 20/32* (2013.01); *G06Q 30/0213* (2013.01); *G06Q 30/0234* (2013.01)

(58) Field of Classification Search
None
See application file for complete search history.

(56) References Cited

U.S. PATENT DOCUMENTS

| | | | |
|---|---|---|---|
| 5,697,844 A | 12/1997 | Von Kohorn | |
| 6,049,778 A * | 4/2000 | Walker et al. | 705/14.14 |
| 7,120,591 B1 * | 10/2006 | Solomon et al. | 705/14.34 |
| 7,305,129 B2 | 12/2007 | Chellapilla et al. | |
| 7,493,268 B2 | 2/2009 | Kepros et al. | |
| 7,668,749 B2 | 2/2010 | Kepros et al. | |
| 8,146,810 B1 * | 4/2012 | Segura | 235/380 |

(Continued)

FOREIGN PATENT DOCUMENTS

WO    WO-2011/063177 A1    5/2011

OTHER PUBLICATIONS

"International Application Serial No. PCT/US10/57331, Search Report and Written Opinion dated Apr. 19, 2011".

*Primary Examiner* — Michael W Schmucker
(74) *Attorney, Agent, or Firm* — Buckley, Maschoff & Talwalkar LLC

(57) ABSTRACT

A proof-of-performance verification system may include a receipt processing facility that receives a receipt image, wherein the receipt processing facility optionally enhances the receipt, converts the receipt image to text, and matches the text to a product or service description in accordance with a terminology database, a proof processor that electronically matches a user-selected reward offer against the product or service description to facilitate offer redemption, and at least one of a payment facility that distributes the offer redemption funds and a rewards facility that communicates incentive rewards to a central location. Related user interfaces, applications, and computer program products are disclosed.

15 Claims, 7 Drawing Sheets

(56) References Cited

U.S. PATENT DOCUMENTS

| | | |
|---|---|---|
| 2002/0103834 A1* | 8/2002 | Thompson et al. .......... 707/526 |
| 2002/0152118 A1* | 10/2002 | Hadjigeorgis ................. 705/14 |
| 2004/0107135 A1* | 6/2004 | Deatherage et al. .......... 705/14 |
| 2004/0181749 A1* | 9/2004 | Chellapilla et al. .......... 715/505 |
| 2006/0100011 A1 | 5/2006 | Morrow et al. |
| 2007/0255653 A1* | 11/2007 | Tumminaro et al. .......... 705/39 |
| 2008/0035724 A1* | 2/2008 | Vawter .................. G06Q 20/20 235/380 |
| 2008/0154715 A1 | 6/2008 | Galinos |
| 2008/0154722 A1 | 6/2008 | Galinos |
| 2009/0324135 A1* | 12/2009 | Kondo et al. ................ 382/284 |
| 2010/0211449 A1 | 8/2010 | Nelson |

* cited by examiner

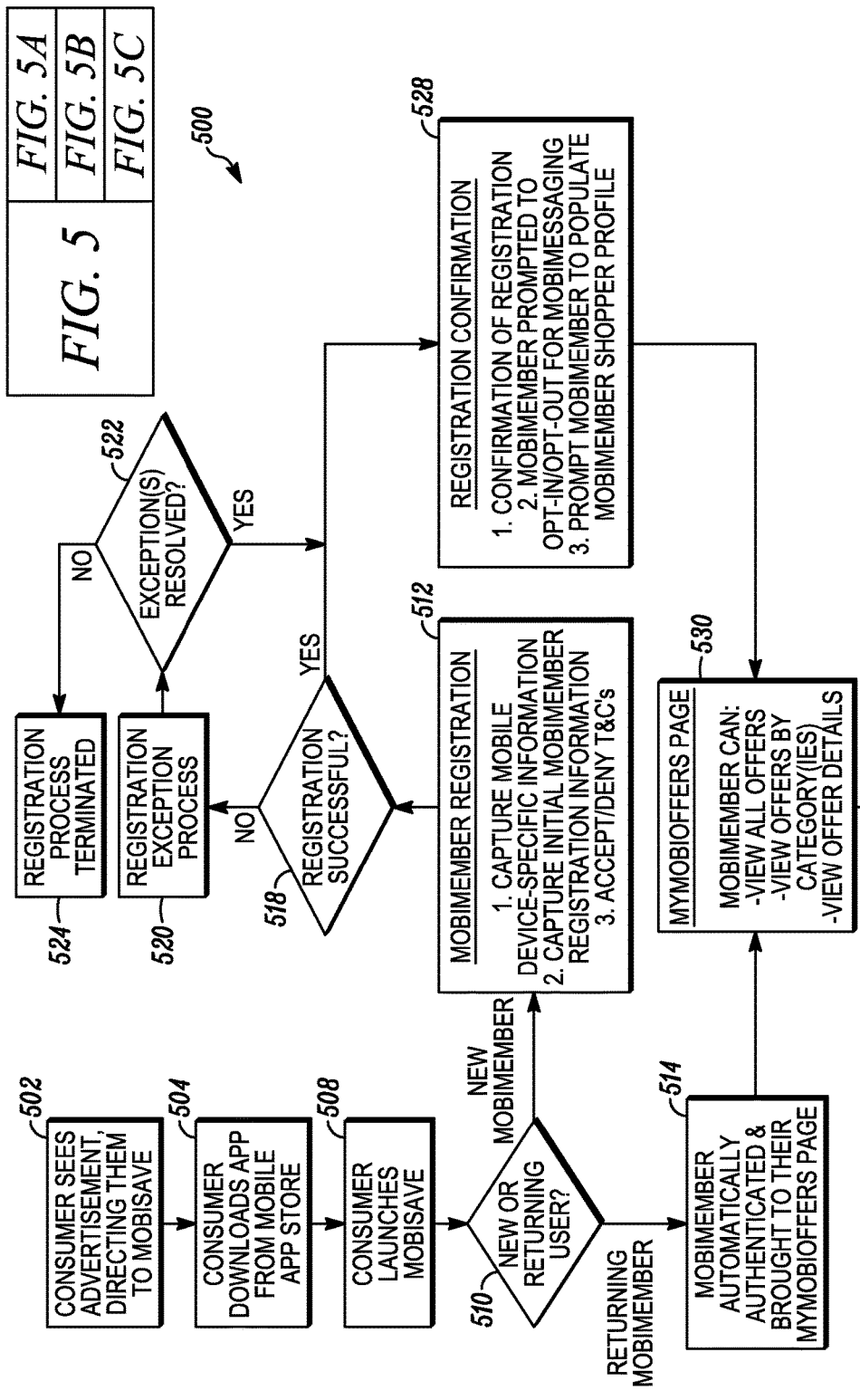

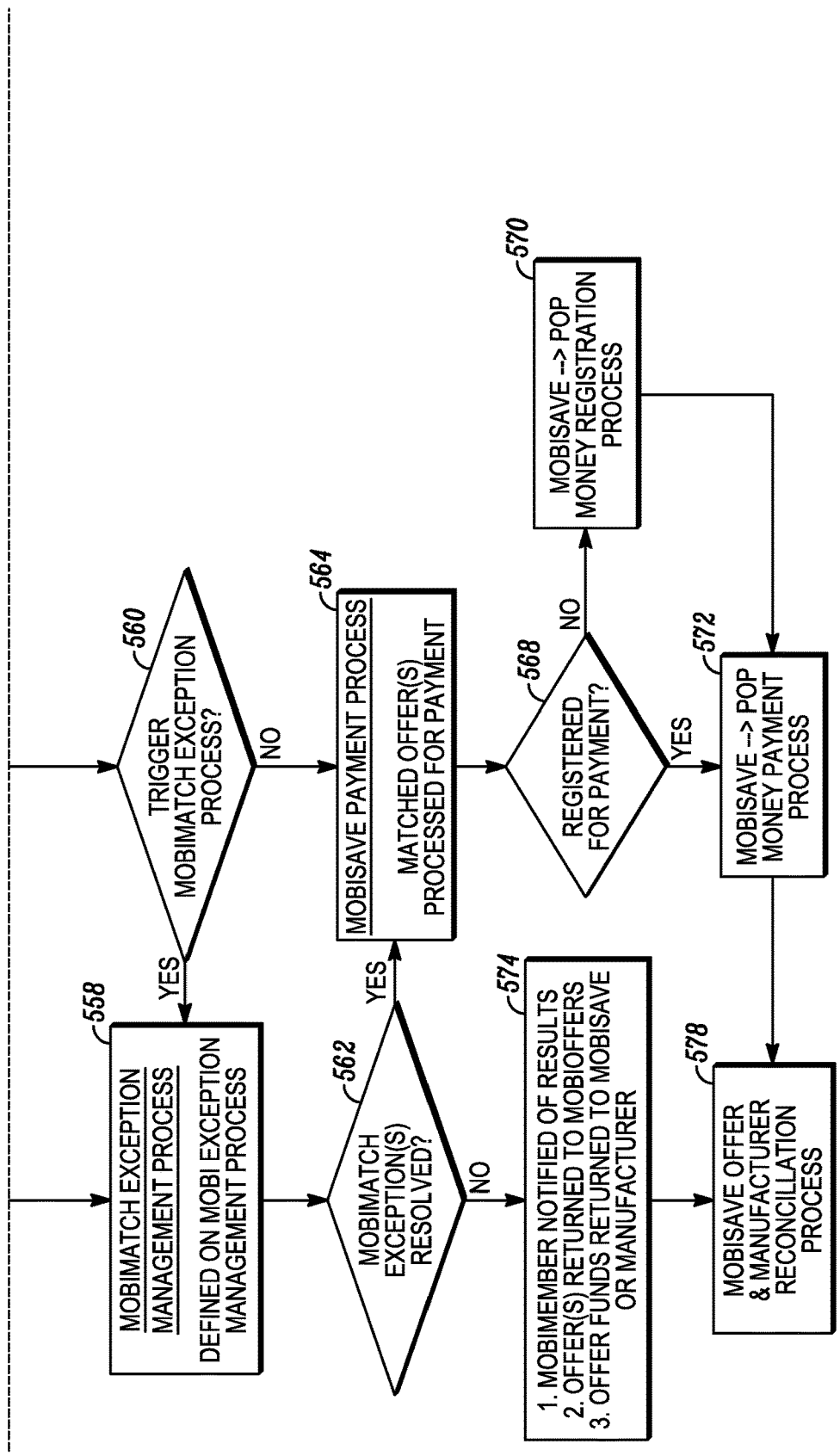

SYSTEM AND METHOD OF ELECTRONICALLY VERIFYING REQUIRED PROOF-OF-PERFORMANCE TO SECURE PROMOTIONAL REWARDS

CROSS-REFERENCE TO RELATED APPLICATIONS

This application claims the benefit of the following provisional applications, each of which is hereby incorporated by reference in its entirety:

U.S. Patent Application No. 61/263,211, filed Nov. 20, 2009; U.S. Patent Application No. 61/264,549, filed Nov. 25, 2009; U.S. Patent Application No. 61/292,940, filed Jan. 7, 2010; and U.S. Patent Application No. 61/380,453, filed Sep. 7, 2010.

BACKGROUND

Field

This invention relates to electronically verifying required proof-of-performance to secure promotional rewards.

SUMMARY

In an aspect of the invention, a proof-of-performance verification system may include a receipt processing facility that receives a receipt image, wherein the receipt processing facility optionally enhances the receipt, converts the receipt image to text, and matches the text to a product or service description in accordance with a terminology database, a proof processor that electronically matches a user-selected reward offer against the product or service description to facilitate offer redemption, and at least one of a payment facility that distributes the offer redemption funds and a rewards facility that communicates incentive rewards to a central location. The receipt image may be captured by an imaging facility of a handheld device, wherein the handheld device may be a mobile phone camera or web-enabled digital camera. The receipt image may be captured by at least one of a webcam, flatbed scanner, a machine designed to capture and transmit images, and an in-store device that allows users to scan and transmit a receipt image. The proof processor may capture and store all information contained on the receipt image. The system may further include a graphical user interface that may allow a user to enter their identification information and/or select at least one offer. The system may further include a rewards offer facility that presents offers that can be redeemed with one or more receipt images as proof-of-performance. The system may further include a reporting facility that provides real-time tracking of offers and redemptions. The system may further include a dashboard that allows offer sponsors to manage and track offers and redemptions.

In an aspect of the invention, a method may include presenting at least one offer to a user for offer selection prior to a purchase of a corresponding product, wherein at least one selected offer can be redeemed by the user with a proof of purchase receipt for the corresponding product, receiving a proof of purchase receipt from a user, wherein the receipt is at least one of a receipt image and a digital receipt, in the case where the receipt is a receipt image, processing the receipt image by converting the receipt image to text using optical character recognition, matching at least one of the text of the receipt and a product code indicated by the receipt with a product or service description in a terminology database to determine at least one product indicated by the receipt, and matching the at least one product to the at least one selected offer, wherein a successful match of a selected offer to a purchased product as indicated by the proof of purchase receipt results in a redemption of the selected offer.

The method may further include enhancing the receipt by at least one of removing creases and modifying contrast. The product code may be one or more of a UPC code, text, or an SKU. Upon a successful product and offer match, a notification may be sent to the user. Upon a successful product and offer match, the redemption fund may be automatically transferred to the user.

In an embodiment, a computer program product may be embodied in a computer readable medium that, when executing on one or more computers, performs the steps of displaying, via a graphical user interface, an inventory list of product offers redeemable by users upon presentation of a proof of purchase receipt, receiving an input, via the graphical user interface, from a user, the input specifying a desired product offer from the inventory list of product offers to be redeemed after purchase of a corresponding product, receiving an input, via the graphical user interface, from a user, the input comprising the proof of purchase receipt from the user, wherein the receipt is at least one of a receipt image and a digital receipt, displaying, via the graphical user interface, an indication of a successful match of the desired product offer with a proof of purchase of a corresponding product, and displaying, via the graphical user interface, an indication of a redemption of the product offer, wherein the indication comprises an indication of a payment.

In an aspect of the invention, a method of aggregating consumers for a group purchase may include negotiating a cash back offer from a vendor, wherein the offer is contingent on a threshold number of users accepting the offer to purchase the product offered by the vendor, wherein the vendor's product is purchased from any retailer, providing each user an offer to participate in a group discount, wherein each member of the group purchases the opportunity to receive the offer upon verifying that a purchase of the vendor's product has been made, receiving proof of purchase verification from the user in the form of a digital image of a receipt or a digital receipt and, optionally, an indication of a registration card, and transmitting payment to the user who purchased the opportunity to receive the offer and subsequently verified that they purchased the product. Verification may include processing a digital image of the receipt for the vendor's product to extract proof-of-performance information, and electronically matching the discount offer against the proof-of-performance information.

In an aspect of the invention, a secure digital receipt system may include a receipts server in communication with a point-of-sale that prepares a secure digital receipt comprising an unalterable digital mark, associating the secure digital receipt with a user identification, and a communications facility that delivers the secure digital receipt to a user. The unalterable digital mark may prevent at least one of alteration, counterfeiting or duplication of the secure digital receipt. The unalterable digital mark is at least one of a bar code, QR code, or image. The unalterable digital mark may encode information including user ID, encryption device or image, encoded text, and a date. The user identification may include at least one of a unique sender ID, an email address and a mobile phone number. Another form of ID including at least one of a fingerprint, eye scan, facial recognition and password may be required to verify the identity of the user possessing the secure digital receipt.

In an aspect of the invention, a voice recognition system may include a voice recognition facility that recognizes a spoken word as a shopping list item, a user interface of the voice recognition facility that enables a user to create and edit a shopping list, wherein the shopping list is generated using the recognized shopping list items and, optionally, manually input shopping list items, and a rewards offer facility that comprises coupons, rebates, or other incentives related to the shopping list items, wherein when the shopping list item is recognized, the shopping list item is searched in a database of coupons or rebates or other purchase incentives for a match to communicate to a user. The voice recognition system may reside on an electronic device. The voice recognition system may reside on a server. The voice recognition system may further include a communications facility that transmits the shopping list to a shopping service that will pick and pack the shopping list items.

In an aspect of the invention, a voice recognition system may include a voice recognition facility that recognizes a spoken word as a shopping list item, a user interface of the voice recognition facility that enables a user to create and edit a shopping list, wherein the shopping list is generated using the recognized shopping list items and, optionally, manually input shopping list items, and a rewards offer facility that stores coupons, rebates, or other incentives related to the shopping list items, wherein when the shopping list item is recognized, the shopping list item is searched in a database of advertisements for a match to communicate to a user. The voice recognition system resides on an electronic device or a server. The voice recognition system may further include a communications facility that transmits the shopping list to a shopping service that will pick and pack the shopping list items.

These and other systems, methods, objects, features, and advantages of the present invention will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The invention and the following detailed description of certain embodiments thereof may be understood by reference to the following figures:

FIGS. 5a and 5b and 5c depict a logical flow for a method of using the proof of-performance verification system.

DETAILED DESCRIPTION

Figure 1:
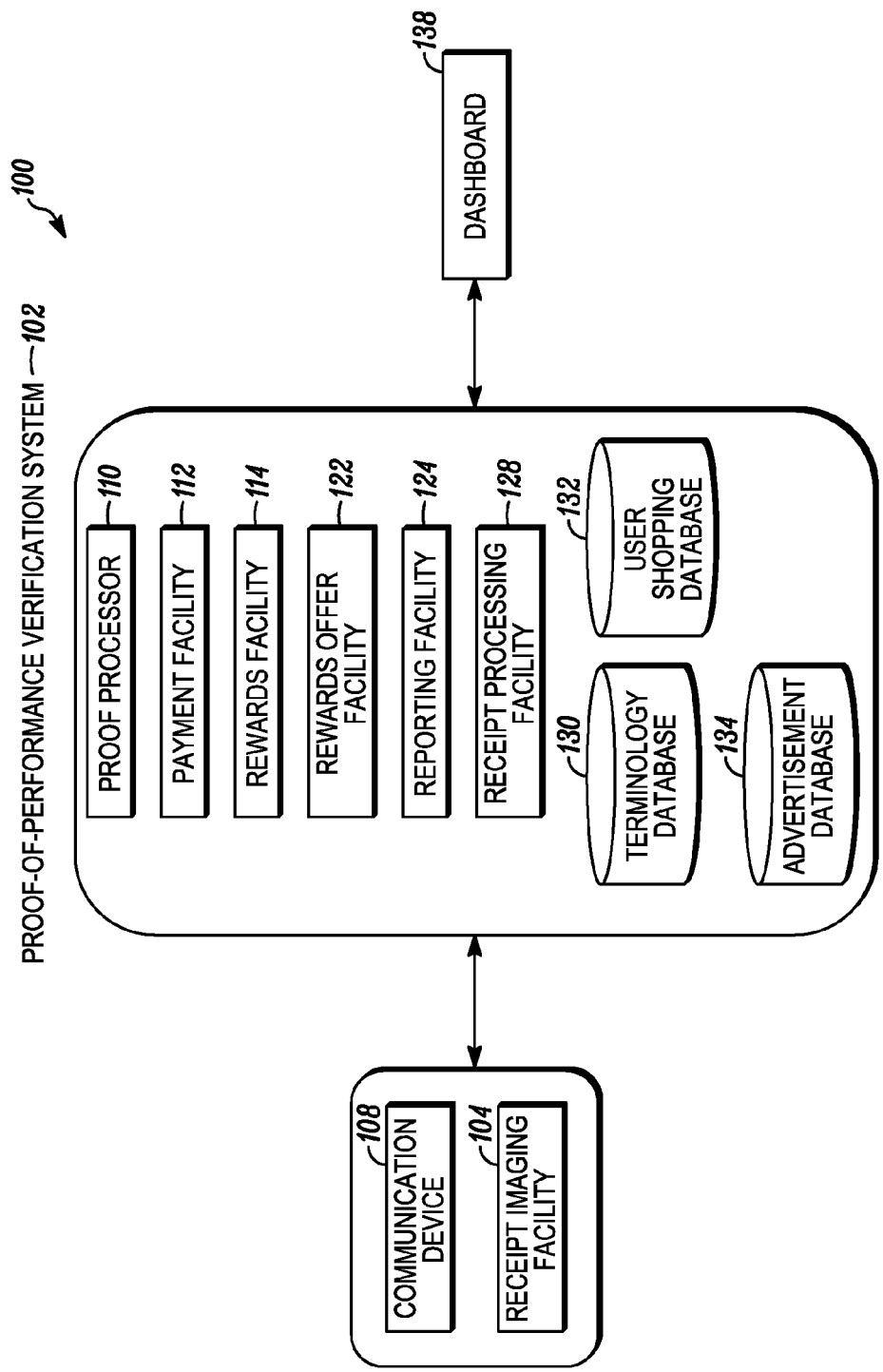
FIG. 1 depicts a block diagram of the proof-of-performance verification system.

The invention allows consumers to secure promotional rewards, such as rebates for purchases or any other desired action, by electronically submitting proof-of-performance, such as proof-of-purchase or proof-of-visit, to the reward sponsor or reward processor. Such actions may occur either in physical retail outlets, at an in-store kiosk or scanning system, on the Internet, by using a webcam attached to a computer, on a communication device 108 such as a mobile phone or web-enabled digital camera, via postal mail or in any manner as desired and acceptable to the reward sponsor. Such proof may be in any electronic form including but not limited to scanned or photocopied receipts, video copied rewards, paperless receipts in the form of emails or text messages, downloaded receipts or performance data from a database of transactions, scanned itemized receipts collected by shoppers on a handheld device or other device, or direct transmission from any source that can provide and prove actual performance behavior.

The communication device 108 may include a physical user interface that allows a user to enter their identification information and display offers and rebates. The user may provide personal identification via keyboard, touch screen, dipping a card, voice recognition, or any other method such as having a sent image tagged with their email address or mobile phone number.

In an embodiment, the system may enable retailer-agnostic rebates and offers—the offer or rebate may be made by the manufacturer of the item and the system may enable redemption of the offer or rebate regardless of where the item may be purchased. Thus, the user is free to purchase the item from any retailer, website, home shopping network, or the like, enabling them to get the best retail price, while still being eligible for additional savings with the manufacturer's rebate/offer that may be redeemed using the system of the invention. The system may include a rewards offer facility 122 that offers many rebates that can be submitted and approved with one or more receipts as proof-of-performance rather than individual proof-of-performance for each offer.

In certain embodiments, a registration card may also be required by the system in order for users to redeem receipts, such as by providing personal identification information. The registration card may enable third parties associated with the system, such as manufacturers, distributors and the like, to acquire customers using the information provided with the registration card.

In an embodiment, a user may learn about promotional offers through any medium including newspaper ads, email/SMS/MMS to their personal computer or their mobile phone, in-store through any advertising device, through a social networking website, through the proof-of-performance verification system, on a home shopping network television station, and the like.

In an embodiment, the user may interact with an application embodying the proof-of-performance verification system to review, select, and redeem offers. The system may be available for such interaction on a smartphone, mobile phone, web-enabled device, desktop computer, laptop computer, tablet computer, kiosk, web-enabled camera, and the like. Offers may be searched by category, product, offer amount, offer details, and the like. In an embodiment, the user may pre-select the offers they want to receive or redeem prior to purchasing the qualifying product. The user may print a list of the offers or download or send such offers to their mobile devices such as smart phones or other web enabled devices. In an embodiment, the system may present offers to individual members based on prior behavior or other distinguishing factor.

The user may then shop, either in a store or via an online shopping website, using the printed list or electronically viewing the selected offers, check out or otherwise pay for items, and retain the paper receipt and/or obtain an electronic receipt. In an embodiment, pre-selection of offers may be required in order to obtain an incentive for actually following through and making the purchase. In some embodiments, offers may be redeemed for items where the offer was not pre-selected but identified as a match anyway by the proof processor 110. Once the purchases have been completed, the user then is able to redeem the offers they pre-selected. The paper or digital receipt serves as the proof-of-performance for offer redemption. The system 102 accepts the receipts for processing in order to determine if an item for which an offer was pre-selected was indeed purchased. Multiple offers may be redeemed using a single receipt.

The proof-of-performance verification system 102 may include inputs from a receipt imaging facility 104, wherein the imaging facility 104 includes facilities for image and/or video capture, and optionally, enhancement and conversion of receipts to proof-of-performance. The imaging facility 104 may be connected to or integral with a communication device 108 that connects to a network, wherein the communication device 108 enables communication between the user and the system 102. The imaging facility 104 may be a handheld device, such as a mobile phone camera or web-enabled digital camera. The imaging facility 104 may be at least one of a webcam, flatbed scanner or a machine designed to capture and transmit images. The imaging facility 104 may be an in-store device that allows users to scan and transmit proof-of-purchase. The communication device 108 may be a kiosk, cell phone, smart phone, PDA, computer, tablet computer, and the like.

For example, the user may use a handheld device, such as a communication device 108, to photocopy or scan the receipt or they may visit a location in-store/nearby/in their office or home where a machine resides that can capture the required receipt image or electronic data. In one embodiment, the scan of the receipt may be in the form of series of photos which may be electronically joined together or a video of the receipt. In an embodiment, the imaging facility 104 may include automated features that facilitate capturing an image of the receipt. For example, in order to capture a series of photos to join into a single image of a long receipt, an accelerometer embedded in the communication device 108 may indicate that the user is holding the device 108 level and assist in steadying the image. When a first image is taken, the length of the portion of the receipt is determined. When the user goes to take the second image of the next portion of the long receipt, as the camera is moved down the receipt into position, the camera automatically senses where the last image left off by the length along the receipt travelled by the communication device 108, which may be sensed by an embedded accelerometer or other sensor that makes measurements such as length. In an embodiment, the device may indicate that the user should stop moving the camera. In other embodiments, the camera may automatically snap an image when it reaches an unimaged portion of the receipt. In an embodiment, a graphical user interface 102 may include a level bubble to graphically indicate when level has been reached.

In an embodiment, the proof processor 110 may capture and store all information contained on the proof-of-performance, including user information.

The receipts transmitted to the proof-of-performance verification system 102 may be sent to a proof processor 110 that electronically matches a reward offer against a proof-of-performance redemption. The proof processor 110 may include image enhancing software and/or image conversion software that converts images into PDF, searchable text or images that can be recognized by humans or machines. The users scanned receipt may be enhanced and interpreted such as with the electronic receipt processing facility 128, which may include technology to remove creases, modify contrast, and the like and OCR technology to convert the scanned receipt to searchable text. Image enhancement and/or processing may be done on the user's handheld device or at an Internet location, such as a server, where the user may submit receipts. The scanned image may be automatically routed to another location for processing. Through two-way communication, the user may be advised that the image may have been successfully received for processing. In the event the user may not provide an adequate scan for processing, alternate methods of submission may be available ranging from flatbed scanners to actually mailing in the receipt.

In an embodiment, the receipt may be identified as belonging to a specific user via the telephone number from which it was submitted, the email address or home address from which it was submitted or emailed, identifying information on the receipt such as one or more of a loyalty card number, credit card number, user name, and the like.

The proof processor 110 may be able to match the text of the receipt with the known shorthand, codes, names, UPC codes, and the like for items from the terminology database 130 via an integrated matching engine. The matching engine may employ a similarity algorithm to decode product or service descriptions on receipts, using information stored in the terminology database 130, and convert them into useful data. For example, a receipt may include a number of grocery items that may be referred to using shorthand or other terminology, names or codes that may be specific to a particular grocery store. The terminology may be supplied to the terminology database 130 by the grocery store, purchased from a third party, or generated by the system 102 provider. In an embodiment, the contents of the entire receipt may be matched by the proof processor 110 or only a subset of items may be matched. For example, the receipt may have categories of products, such as certain grocery store receipts that are categorized along the lines of produce, health and beauty aids, butcher shop, and the like. In this example, the proof processor 110 may only process categories of items that align with the categories of offers selected by the user. In an embodiment, the system may take the OCR output on the entire receipt line-by-line to look for the best matches for the product or service descriptions. The terminology database may have a plurality of variations of the product or service descriptions corresponding to the various terminology used by various retailers. In an example, a similarity score threshold may be set, such as on a scale of 1 to 1000 where 1000 is a perfect match, and if one or more lines is at or above that threshold, a positive match may be declared. If more than one line is above the threshold, the system may take the highest score as the best match positive match and declare that the winner.

In an embodiment, the system 102 may include normalization technology to normalize various codes and shorthand used by different vendors for a single item. Continuing with the example of a receipt from a grocery store, a 28 oz box of APPLE JACKS may be referred to as APPLEJACKS28 by one store, KELLOGGS APPLE JACKS 28 OZ in another store, and 28 KELLOGS JACKS by a third store. The terminology database 130 may be able to normalize the various terminologies by indicating that all three terminologies refer to the same product.

In an embodiment, a predictive algorithm may be used by the system to detect unknown descriptions, build a list of terminologies used by a vendor for which the system 102 does not have database entries, and the like. Continuing with the example of grocery, a store may not choose to provide their terminologies to the terminology database 130. One way of beginning to build a terminology database 130 for the grocery store is through iterative learning from receipts. For example, if the store refers to the 28 oz box of APPLE JACKS as 28APPLEJACKS, then it may be predicted that the terminology for the 14 oz box is 14APPLEJACKS.

In an embodiment, the terminologies in the terminology database 130 may be modified or corrected after receiving feedback, such as an indication from a plurality of users that a supermarket may have changed their terminology for a particular item.

Figure 4:
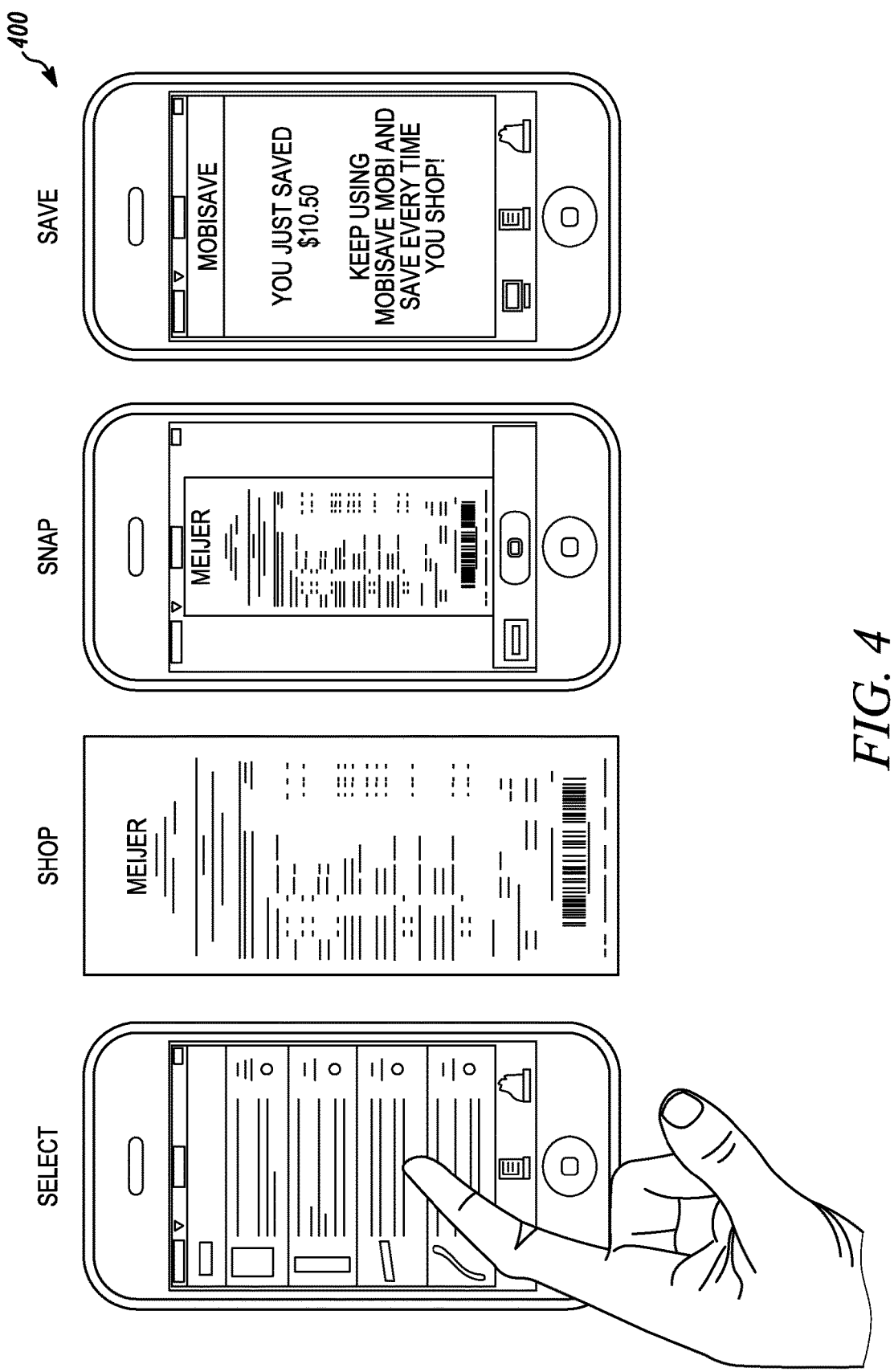
FIG. 4 depicts a series of images depicting a method of using the proof-of-performance verification system.

At this point, and referring to FIG. 4, a user may have interacted with the system 102 to browse and select offers that they would like to receive next time they shop. They then can go shopping and either receive a digital receipt for submission to the system or a paper receipt for imaging and image processing. In any event, the proof processor 110 may decode what products appear on the receipt using an algorithm and a terminology database 130. The proof processor 110 may then match the pre-selected offers to the products actually purchased by the user or search the products on the receipt by all known product or service descriptions for the selected offer or offers. In embodiments, a successful match may be indicated by surpassing a threshold score for similarity. For example, a positive match may be declared when one or more receipt lines score above the threshold.

When a successful match is made, an indication may be sent to a payment facility 112 that distributes the reward or rebate. In an embodiment, the user may be shown the results of the processing at the scanner location, on their handheld device or other location advising them of the promotional rewards that have been processed and approved. The reward may be a cash rebate, a mailed check, a direct deposit, rewards points, frequent flier miles, a gift card, and the like. The rewards may be credited to a holding account, sent to the user in the form of a negotiable instrument, credited to an account for later use or retrieval, sent to a bank account, optionally transmitting the payment by ACH, to a credit or debit card, to an online payment system such as PAYPAL, to a holding account that can be used for online purchases optionally with a bonus, to a stored-value card, and the like. A rewards facility 114 may communicate incentive rewards to a central location. The payment facility 112 may obtain money from an escrow account funded by a manufacturer, write to a stored-value card or perform some other financial transaction. In an embodiment, the manufacturer may pay for the redemption by directly transferring money to a user account. The user may check the status of the reward processing on their mobile phone or at any other location connected to the Internet.

In cases where there was no pre-selection of an offer, a reduced offer may be presented or a cumulative offer may be initiated. For example, the receipt scan and interpretation may show that the user purchased a 12 pack of FRESCA. While there may be no current offer for FRESCA or the user may not have pre-selected a FRESCA offer, the user may be enabled to initiate a cumulative purchase offer for future purchases of FRESCA. For example, the offer may be "Purchase 3 more 12-packs of FRESCA and receive $1 off each 12-pack." In an embodiment, the offer may be time sensitive. The system 102 may track how many FRESCA packs have been purchased.

When the user is informed of what they have saved, the system may then show the list of offers that were matched where the user is given the opportunity to indicate if a match was missed. If they indicate that a match was missed, the system may provide a facility for identifying the missing items, such as by highlighting the OCR'd receipt, sending an email, sending an MMS/SMS, providing feedback on a website or mobile application presenting the system, and the like. The system may then be prompted to one or more of correct the OCR, update the terminology database and credit the user for the found item.

In certain embodiments, at checkout a user may present a unique identifier recognized by the system 102, such as in the form of a card, bar code or QR code on a mobile device, RFID-embedded tag in a mobile device, NFS card, retinal scan, fingerprint, facial recognition scan, or the like. The unique identifier may be used to tag the retailer's transaction log for that user's market basket. Either on a real-time basis or any other time after purchase, the tagged transactions are used to match purchases against offers selected. Payment to users may be made as described herein.

Figure 5B:
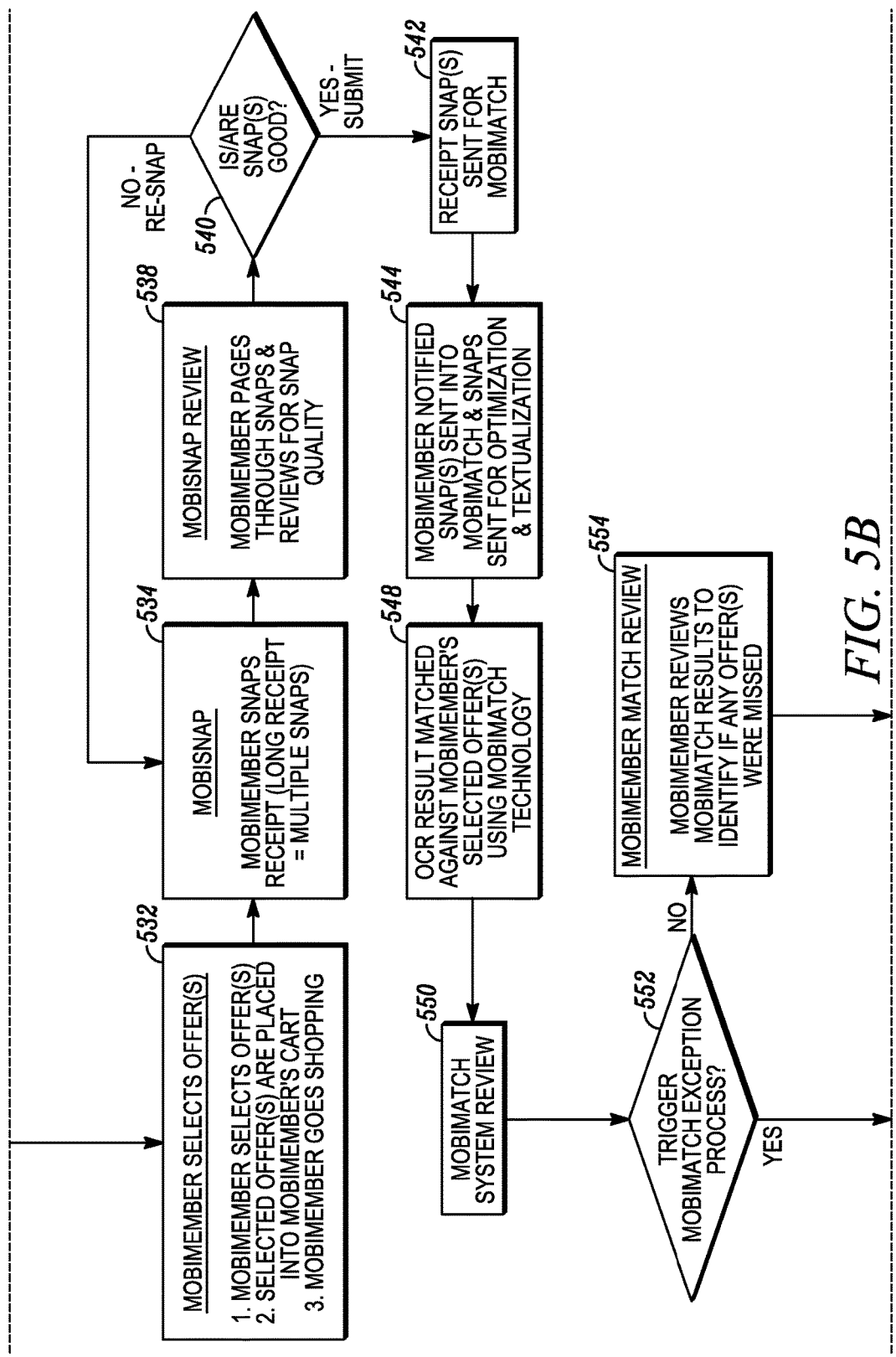

Referring to FIGS. 5*a* and 5*b*, a flowchart for an embodiment of the proof-of-performance verification system is depicted. At step 502, a user may see an advertisement directing them to a website or other portal for accessing the system 102. They may be prompted to download an application such as from an App Store at step 504 and launch the system 102 at step 508. At step 510, a test may determine if the user is new or returning. A new user may be prompted to register at step 512 where mobile device-specific and initial registration information may be captured along with acceptance or denial of terms and conditions. A test at step 518 may determine if registration was successful. If it was not, logical flow may proceed to step 520 where a registration exception process may be initiated. At step 522, a test may determine if the exception was resolved. If it was not resolved, registration may terminate at step 524. If the exception is resolved or if initial registration was successful, logical flow may proceed to registration confirmation at step 528 where users may opt-in or out of messaging and the user may populate a shopper profile. After either confirmation of a new user at step 528 or successful authentication of existing users at step 514, logical flow may continue to step 530 where users can go to a customized home page at step 530. At the customized home page, user may view offers and offer details with or without a category filter. At step 532, users may select one or more offers for placement into a system 102 cart prior to going shopping for the product(s) of the offer(s). After purchasing the one or more products, the receipt is imaged in step 534, such as via taking one or more photos of it, scanning it, faxing it, or the like. The user may review the image at step 538. A test at step 540 may determine if the image is good. If the image is good, logical processing flow may continue to step 542 on FIG. 5*b*. If the image is not good, logical flow returns to step 534 for re-imaging. At step 542, the receipt image, or a digital receipt, may be submitted to the system 102. At step 544, the user is notified that the imaged or digital receipt was sent into the system 102 for optimization and textualization. At step 548, the OCR result or text from the digital receipt may be matched against the user's selected offer(s) using the system's 102 matching algorithm. After a review at step 550 of the one or more matches, a test at step 552 may determine if a match exception process may be triggered. If the outcome of the test is negative, logical processing flow may proceed to step 554 where the user may review the matches to identify if any matches were missed. At step 560, another test may determine if an match exception process should be triggered. If the outcome of step 560 is negative, logical processing flow may proceed to step 564 where the matched offers may be processed for payment. If the outcome of step 560 or step 552 is affirmative, a match exception management process may be triggered at step 558. Logical processing flow then continues to a test at step 562 to determine if the match exceptions were resolved. If the outcome at step 562 is negative, logical processing flow may continue to step 574 where the user is notified of the results, the offers are returned to the system 102, and the offer funds may be returned to the system 102 or the manufacturer. Logical processing flow may then proceed to an offer and manufacturer reconciliation process at step 578. If the outcome of the test at step 562 is affirmative or the outcome of step 560 is negative, logical processing flow may continue to step 564 where the matched offers may be processed for payment. A test at step 568 may determine if the user is registered for payment. If the outcome of the test at step 568 is negative, logical processing flow may continue to step 570 where the user may register for payment either with the system or with a third party. If the outcome of the test at step 568 is positive or after registration at step 570, payment may be made at step 572. Logical processing flow may terminate at step 578 with an offer and manufacturer reconciliation process.

Figure 6:
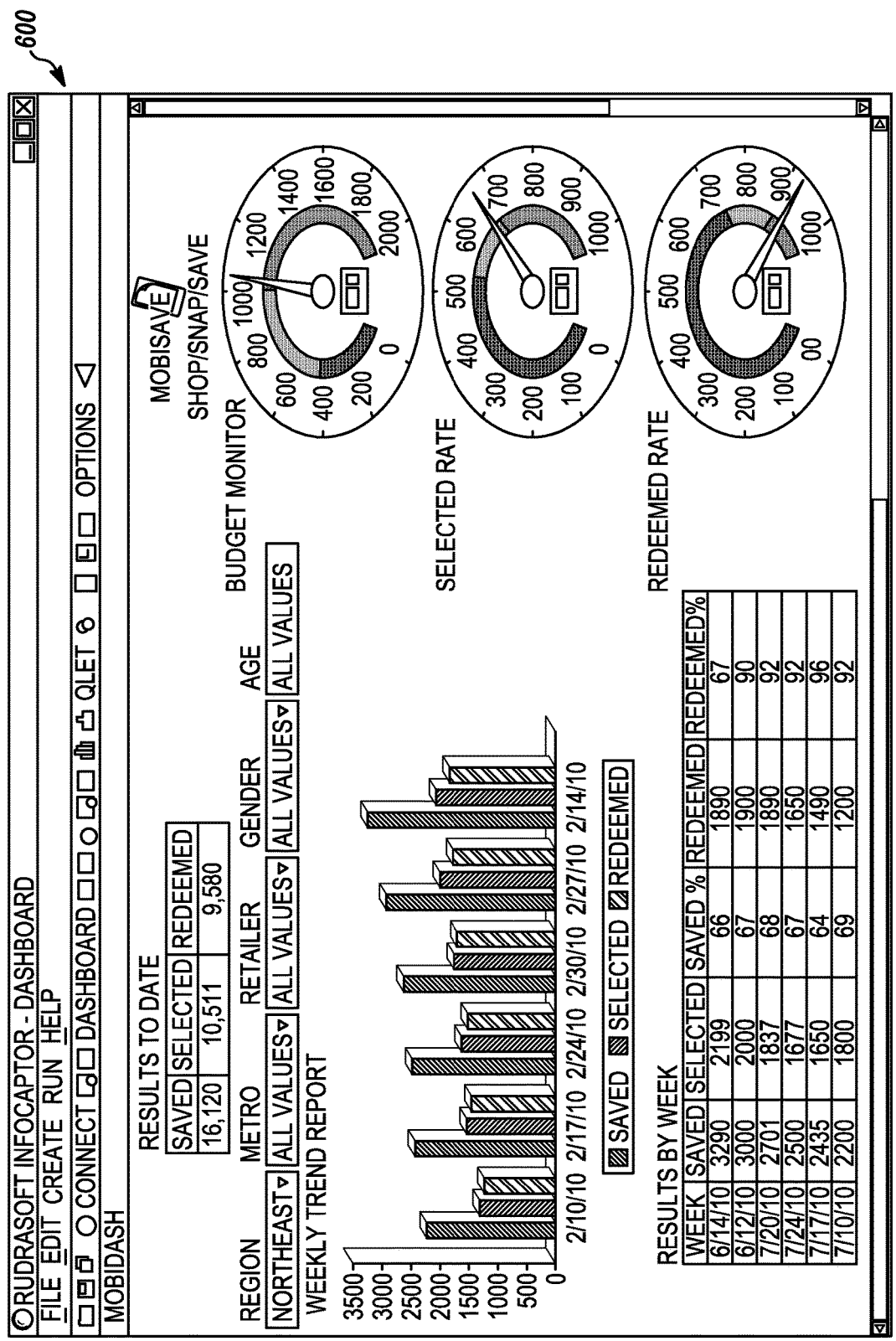
FIG. 6 depicts a screenshot of a manufacturer dashboard.

Referring now also to FIG. 6, the system may further include a reporting facility 124 that provides real-time tracking of offers and redemptions. Offer sponsors, marketers, and retailers may use a dashboard 138 to interface with the reporting facility 138 to view offer redemption tracking by any variable or measure, interface with the proof processor 110 to audit or confirm redemptions, interface with the rewards offer facility 122 to submit new offers, modify offers, delete offers, and the like, interface with a terminology database 130 to submit new terminology data for their products, modify or confirm existing data, or to delete data, interface with a user shopping database 132 to view all shopping behavior, not just behavior with respect to their products/offers, interface with a payment facility 112 to make payments, and the like. Manufacturers may use the dashboard 138 to examine data by region, metro, retailer, gender, age, product category, and the like. Manufacturers may use the dashboard 138 to examine total numbers served, offers selected, and offers redeemed. Manufacturers may use the dashboard 138 to obtain a trend report for redemptions. Manufacturers may use the dashboard 138 to examine a budget monitor, selected rate, redeemed rate and the like. Manufacturers may use the dashboard 138 to examine results by week, such as numbers served, selected, redeemed, and the like.

In an embodiment, users of the proof-of-performance verification system would not be required to search for paper coupons, clip coupons and present each coupon at checkout. Instead, this system does not require carrying individual coupons and does not require presenting them at checkout. Also, compared to traditional mail-in rebates, the user may quickly submit their proof electronically without having to fill out forms, enclose UPC codes, surrender their original receipt, pay for postage or visit the bank to cash or deposit small checks. The user may also receive notification of rewards within minutes rather than waiting weeks. The processing costs to the rewards sponsors, such as manufacturers, may be substantially reduced by automating the verification system and transmitting information and payments electronically.

Fraudulent use of digital incentives, such as home printed coupons, may be avoided because rewards are only given after verification. Also, the system may not be prone to counterfeiting, alteration or duplication of printed coupons because no self-printed material is used for actual verification. Further, the system may capture unique characteristics of each store's receipt, such as formatting, font, art, and the like, so that receipt counterfeits may be detected. Fraudulent use of newspaper coupons by retailers or individuals or organizations may be completely avoided in this system. The system may entirely circumvent retailer systems mitigating all problems associated with implementing any system that must interact with the retailers' own point-of-sale systems. This also means the system may be rapidly deployed and reward purchases made in any store including those that do not accept manufacturer coupons. In an embodiment, the system may capture information from the receipt, such as time, date, location, and transaction numbers of the receipt to detect duplicates. Having receipt information, such as the time and date, may also assure that the user has selected the offer first before purchasing or checking out. This assures offer sponsors that they are not rewarding purchases that were already made or based on found receipts. The system may track member behavior over time and examine outliers who may be perpetrating fraud. For example, the system may examine the frequency of receipt submission and the numbers of matches per receipt to identify potential fraud. The system may also sample receipts and check the originals with retailers to make sure there are no counterfeits.

In an example, a user may want to purchase a new camera from a specific manufacturer. The camera manufacturer, through the system, may offer the consumer $100 off the purchase of the camera made at any retailer via a savings certificate. Consumers, who may optionally have a membership in the system, may buy, for a fee, the $100 discount offer, such as in the form of a savings certificate, coupon, rebate, or the like. The discount offer may be purchased by the consumer on a website accessing the system or a mobile application interface to the system. Once the purchase of the specified camera may be made, a digital image of the receipt or a digital receipt may be submitted to the system using methods previously described herein, optionally along with an image, scan, swipe, tap, or manual entry of a registration card. The receipt and the optional evidence of a registration card may serve as a proof of purchase. The system would then recognize that they purchased the product associated with the offer via methods described herein and match the offer against the proof-of-purchase. In an embodiment, the discount offer may then be distributed to the user in the form of a $100 payment or credit. The payment may be sent by any means for making a payment, such as cash, check, direct deposit, credit, money order, gift card, mobile payment, and the like. The manufacturer may cover the $100 discount while the system may retain the fee. The benefit for manufacturers is they are doing rebates and providing discount offers without any processing or marketing costs and they may acquire customers because of the registration card.

In an embodiment, the offer may only be honored by the camera manufacturer if a threshold number of users purchase the specified computer.

In an embodiment, the system may enable giving and redeeming gift certificates for specific products. For example, a user may want to give a budding photographer a $100 gift certificate towards the purchase of a CANON camera. The receiver would be notified by the system that they have $100 waiting to be redeemed once they purchase the CANON camera. Once they purchase the CANON camera and provide proof-of-purchase as previously described herein, the gift certificate may be redeemed as a payment, credit, refund, or the like.

In an embodiment, a user shopping database 132 for future marketing efforts may be built from the receipt information captured. Since the entire receipt is being scanned, all of the purchase data may be stored. These sales data may be stored along with information regarding the store, the user, past purchase data, purchase behavior, redemptions history, and the like. For example, a manufacturer may be able to use purchase behavior to refine their offers, target their offers such as based on prior category purchases, eliminate offers, improve their offers, launch new products to early adopters, defend against private label, cross-sell based on lifestyle/tastes, find new product opportunities based on companion purchases, pantry load to build loyalty, reach heavy category/brand users, filter out less profitable bargain hunters, track brand switching and vulnerability, recruit search subjects quickly and inexpensively, and the like. In an embodiment, an advertisements database 134 may be included in the system 102. Manufacturers may upload advertisements to deploy to users accessing the system 102, accessing a specific offer, users requesting additional product details, and the like.

In an embodiment, a proof-of-performance verification system may include a software application either downloaded to a mobile phone, such as an IPHONE App, or other electronic processing device such as a personal home computer or laptop. The software may perform processing to facilitate verification of proof-of-performance. This processing may include receipt scanning, image enhancement, OCR conversion into searchable text, matching performance against requirements of offers, communicating with a remote processing facility that performance requirements have been met and thus having the remote processing facility provide rewards in any manner such as issuing checks, crediting accounts, making online payments, adding funds to a stored-value card or other system with writeable memory such as an RFID chip in a mobile phone, adding points or frequent flier miles to an account or any other desired manner of receiving the rewards. The system may also include using biometric finger print scanning to verify the actual user of the system as part of a registration for membership, offer selection and submission of proof.

In another embodiment, the proof-of-performance verification system 102 may not require physically imaging or scanning a receipt or other proof of performance. In this embodiment, performance data may be electronically transmitted to a mobile phone or other handheld device or directly to the rewards sponsor or the rewards sponsor processor and payment may be made directly to said handheld device which may contain a memory card such as an RFID chip. In this embodiment, actual itemized purchase data or other data held by the RFID chip in memory or other means may be transmitted to the remote location and used as proof-of-performance and said reward may be provided upon proof-of-performance by electronically communicating with the RFID chip and its payment system. For example, and without limitation, a shopper may use their mobile phone to scan product barcodes as they shop in a supermarket and then checkout by having the supermarket point of sale system scan the data collected in the mobile phone on checkout. The mobile phone may house an RFID chip which may be linked or may communicate to a bank or credit card account and the RFID chip may communicate payment information to the supermarket point-of-sale system. The itemized purchase information on that chip may also be used as proof-of-purchase for the above mentioned rewards system. The itemized purchase information would be sent from the mobile phone to the remote processing facility for verifying the purchase. The remote processing facility may then electronically communicate back to the mobile device and RFID chip which will then provide an award credit to the linked bank account or other reward repository as desired by the shopper.

The proof-of-performance verification system may be a centralized system that collects proof-of-performance data and images for later forwarding to the remote processing facility and can electronically match the offers against the proof-of-performance and capture for future use all other information contained on that receipt or other proof.

The proof-of-performance verification system may include a receipt scanner, camera, fax machine, or other device to capture an image and a display screen, such as an LCD or CRT, or mobile phone screen. The screen may have touch screen capability. The proof-of-performance verification system may include a two-way modem or other communications device hardwired or wirelessly connected to a network. The proof-of-performance verification system may include a keyboard or pin pad allowing the user to enter their identification information. The proof-of-performance verification system may include a card reader. The proof-of-performance verification system may include a reloadable stored-value card or other such card which may retain the incentive rewards for later use by the user of the system. The proof-of-performance verification system may include a facility to write to a stored-value card and or communicate incentive rewards to a central location for later use. The proof-of-performance verification system may include a payment facility to distribute the rewards.

In an embodiment, the proof-of-performance verification system may include a secure digital receipt (SDR) system to enable secure digital receipts, also referred to as paperless receipts or e-receipts, to be used for offer and rebate redemptions. For example, a shopper may have a choice of a printed paper receipt and/or having the receipt emailed or sent via SMS, MMS, and the like. In an aspect of the invention, a process for using the secure digital receipt (SDR) system may involve Traditional and Internet retailers agreeing to use the SDR system software at their checkouts. Shoppers may become a member of the SDR system and undergo a verification process to authenticate their identity, such as with personally identifiable information. At checkout, the shopper may request a secure digital receipt (SDR). The SDR may be in form of an image, such as a PDF or in text. The SDR may contain a "watermark" or some other means to prevent alteration, counterfeiting or duplication. The watermark may be in the form of a bar code, QR code, or the like containing information such as user ID, encryption device or image, encoded text, a date stamp, and the like. The SDR may also be associated with a unique sender ID, such as an email address or mobile phone number that identifies the user. The SDR system may require another form of ID such as fingerprint, eye scan, facial recognition or password to verify the identity of the user. The shopper may use the SDR in the proof-of-performance verification system as proof-of-purchase to redeem product rebates by emailing or using another digital or electronic method for submission. The SDR system may prevent shoppers from tampering, altering, duplicating or counterfeiting receipts. Such receipts may be used for rebate redemption or proof-of-purchase for returns.

Figure 2:
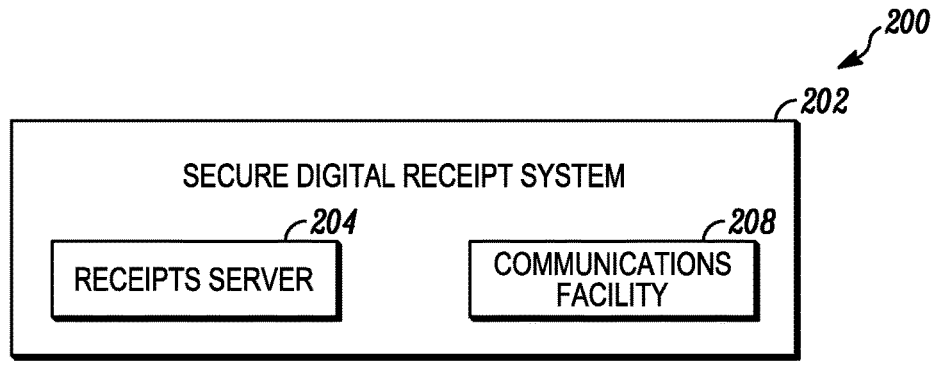
FIG. 2 depicts a secure digital receipt system.
Figure 3:
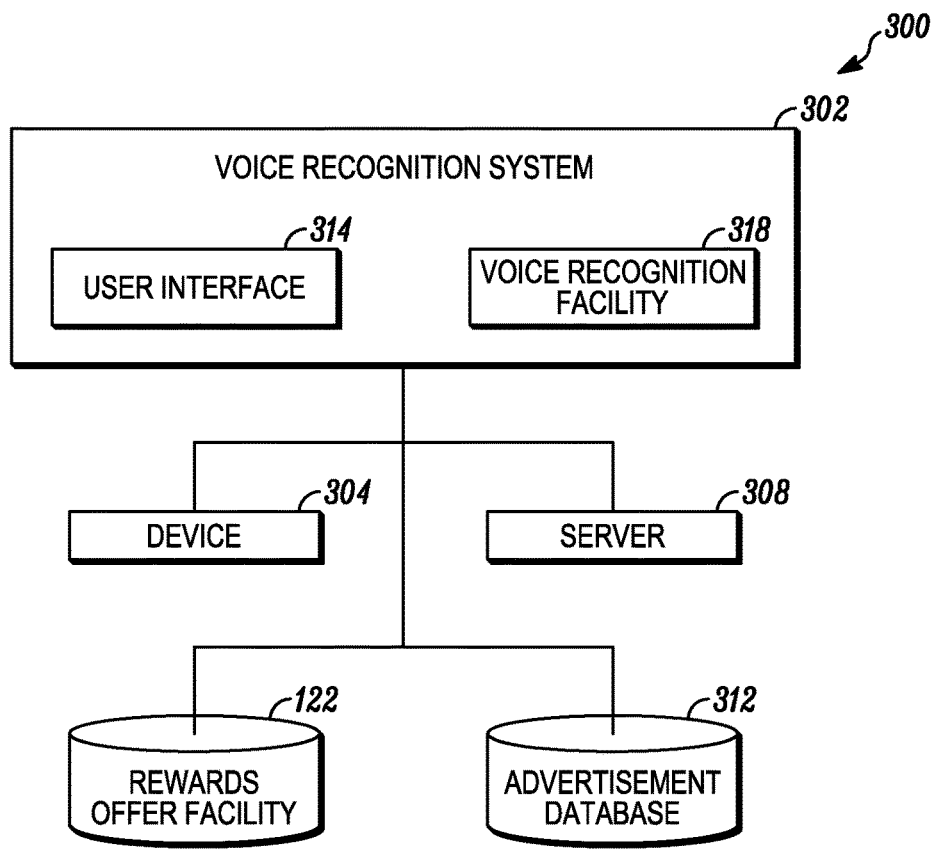
FIG. 3 depicts a voice recognition system.

Referring to FIG. 2, a secure digital receipt system 202 may include a receipts server 204 that prepares a secure digital receipt and a communications facility 208 that delivers the secure digital receipt to a shopper.

In an embodiment, the proof-of-performance verification system 102 may include a voice recognition system 302 that may enable a user to speak into an electronic device 304, such as a computer, handheld device, mobile phone, and the like, to create a shopping list using voice recognition technology. The voice recognition system 302 may be a software application residing on the device 304 or on a server 308 including a user interface 314 and a voice recognition facility 318. The voice recognition facility 318 may recognize the spoken word as a product or brand name and create a shopping list including the recognized products and brands. In another embodiment, the shopping list may be generated from scanned bar codes. The shopping list may be printed or carried on the device into a store. In an embodiment, the shopping list may be transmitted to a shopping service that may then pick and pack the shopping list items. Using the user interface 314, the user may create a new shopping list, modify an existing shopping list, manually input new items, and the like.

In an embodiment, the proof-of-performance verification system 102 may determine if there are coupons or rebates or other purchase incentives available for the recognized items and then let the user know of their existence in any manner including, but not limited to, modifying the shopping list, sending text or email messages to the user, or any other method that communicates with the shopping list creator. For example, the proof-of-performance verification system 102 may use the voice recognition facility 318 to recognize a spoken word. Once the word is recognized, the spoken word may be searched in a database of coupons or rebates or other purchase incentives 310. If there is a match, the coupons or rebates or other purchase incentive may be communicated to the user. In an embodiment, the proof-of-performance verification system 102 may also send or display an advertising message related to the category, product or brand to the user. For example, the proof-of-performance verification system 102 may use the voice recognition facility 318 to recognize a spoken word. Once the word is recognized, the spoken word may be searched in a database of advertisements 312. If there is a match, the advertisement may be communicated to the user.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A proof-of-performance verification system for providing purchase incentives to customers over a computerized telecommunications-based system utilizing electronic transmission of images of paper purchase receipts, the system comprising:
    a selected-offers storage facility, storing a plurality of reward offers selected by a registered user of the verification system, each of said selected reward offers being selected at a respective time of selection;
    a receipt processing facility that receives a receipt image, the receipt image being an image representing a paper receipt issued to the registered user in a product or service purchase transaction as a record of said transaction, the receipt processing facility being operative to convert the receipt image to a text representation of the receipt image, and to match the text representation of the receipt image to a product or service description maintained in a terminology database, the image having been captured by the registered user via an imaging facility of a handheld device, the receipt image including a representation of a date and time of the purchase transaction; the receipt processing facility receiving, in association with said receipt image, device-specific information that identifies said handheld device, the device-specific information associated with the registered user; the receipt processing facility identifying said registered user from the device-specific information;
    a proof processor that electronically matches one of said stored reward offers selected by the identified registered user against the product or service description to facilitate offer redemption, the proof processor verifying that the date and time of the purchase transaction as represented by the received image is later than the respective time of selection of the matched one of said stored reward offers selected by the identified registered user;
    said proof processor informing the identified registered user of all offers matched to the receipt image;
    said proof processor receiving an indication from the identified registered user as to at least one selected offer that should have been matched to the receipt image but was not matched to the receipt image, said indication including an identification of a receipt item in the receipt image that should have been matched to one of said at least one selected offer;
    said proof processor including a database of images of paper purchase receipts;
    at least one of a payment facility that distributes the offer redemption funds; and
    a rewards facility that communicates incentive rewards to a central location;
    said proof processor further operative to:
        identify a retail store that issued the paper receipt; and
        detect a font and/or printed art element in the paper receipt as represented in the receipt image to ensure validation against a known font and/or printed art element utilized by the identified retail store.

2. The system of claim 1, wherein the handheld device is at least one of a mobile phone having a camera functionality and a web-enabled digital camera.

3. The system of claim 1, wherein the proof processor stores a record of at least some of the information contained on the receipt image.

4. The system of claim 1, further comprising, a graphical user interface that facilitates a user entering their identification information into the system.

5. The system of claim 1, further comprising, a graphical user interface that facilitates a user selecting at least one reward offer.

6. The system of claim 1, to further present reward offers that can be selected by a user and redeemed with one or more receipt images as proof-of-performance.

7. The system of claim 1, to further generate a report that includes at least real-time tracking of the reward offer and the offer redemption.

8. The system of claim 1, to further generate a graphical dashboard that includes information associated with at least the reward offer and the reward redemption.

9. A computer-implemented method of providing purchase incentives to customers over a computerized telecommunications-based system utilizing electronic transmission of images of paper purchase receipts, comprising:
    presenting, by a computer, a plurality of offers to a user for offer selection prior to purchase of corresponding products associated with the offers, wherein the selected offer can be redeemed by the user with a proof of purchase receipt for the corresponding product;
    receiving and storing a plurality of said offers selected by the user, each of said selected offers being selected at a respective time of selection;
    receiving, by a computer, a proof of purchase receipt from a user, the receipt being a receipt image representing a paper receipt issued to the user as a record of a purchase transaction, the receipt image having been captured by the user via an imaging facility of a handheld device, the receipt image including a representation of a date and time of the purchase transaction;

receiving, in association with the receipt image, device-specific information that identifies the handheld device, the device-specific information associated with the user;

identifying the user from the received device-specific information;

processing the receipt image by converting the receipt image to a text representation using optical character recognition;

matching, by a computer, the text representation of the receipt image with a product or service description in a terminology database to determine at least one product indicated by the receipt; and matching, by a computer, the at least one product indicated by the receipt to one of the stored offers selected by the identified user;

verifying that the date and time of the purchase transaction as represented by the receipt image is later than the respective time of selection of the matched one of said stored offers selected by the identified user;

wherein a successful match of a selected offer to a purchased product as indicated by the proof of purchase receipt with verification that the date and time of purchase transaction is later than the time of selection of the matched offer results in a redemption of the matched offer;

the method further comprising:

storing, by the computer, a database of images of paper purchase receipts;

informing the user of all offers matched to the receipt image; and receiving an indication from the user as to at least one selected offer that should have been matched to the receipt image but was not matched to the receipt image, said indication including an identification of a receipt item in the receipt image that should have been matched to one of said at least one selected offer;

identifying a retail store that issued the paper receipt; and detecting a font and/or printed art element in the paper receipt as represented in the receipt image to ensure validation against a known font and/or printed art element utilized by the identified retail store.

10. The method of claim 9, further comprising enhancing the receipt image by at least one of removing creases and modifying a contrast of the receipt image.

11. The method of claim 9, further comprising, upon a successful product and offer match, sending a notification to the user.

12. The method of claim 9, further comprising, upon a successful product and offer match, automatically transferring a redemption fund to the user.

13. The method of claim 9, wherein the receipt image is formed from a plurality of images taken by the handheld device along a dimension of the paper receipt.

14. The method of claim 9, wherein the matching steps include matching the text representation of the receipt image to at least two products indicated by the receipt, and matching each of a plurality of the at least two products to a respective one of the stored offers selected by the user.

15. The method of claim 9, wherein the received device-specific information that identifies the handheld device is a mobile telephone number associated with the user.

* * * * *